United States Patent [19]  [11] 3,989,509
Chou et al.  [45] Nov. 2, 1976

[54] CATALYTIC HYDROGEN REDUCTION OF METALS FROM SOLUTIONS

[75] Inventors: Eddie C. Chou, Arvada, Colo.;
Ranko P. Crnojevich, Gretna, La.;
Harold Koehler, Fort Madison, Iowa

[73] Assignee: Amax Inc., Greenwich, Conn.

[22] Filed: Nov. 19, 1975

[21] Appl. No.: 633,236

[52] U.S. Cl. .................. 75/.5 A; 75/108; 75/117; 75/119
[51] Int. Cl.² .............. C22B 15/12; C22B 23/04
[58] Field of Search ............. 75/.5 A, 108, 117, 119

[56] References Cited
UNITED STATES PATENTS

| | | | |
|---|---|---|---|
| 2,734,821 | 2/1956 | Schaufelberger | 75/108 |
| 2,740,708 | 4/1956 | Papee | 75/108 |
| 2,805,139 | 9/1957 | McGauley | 75/.5 A |
| 2,853,374 | 9/1958 | Schaufelberger | 75/.5 A |
| 2,853,380 | 9/1958 | Evans et al. | 75/.5 A X |
| 3,156,556 | 11/1964 | Meddings et al. | 75/.5 A |
| 3,694,185 | 9/1972 | Kunda et al. | 75/.5 A |
| 3,775,098 | 11/1973 | Kunda et al. | 75/108 |

Primary Examiner—L. Dewayne Rutledge
Assistant Examiner—E. L. Weise
Attorney, Agent, or Firm—Kasper T. Serijan; Eugene J. Kalil

[57] ABSTRACT

An improved method is provided for efficiently precipitating metal powder selected from the group consisting of nickel, cobalt and copper from aqueous solutions using sulfur-free hydrogen at elevated pressure and temperature, the improvement residing in adding to the solution a small but effective amount of a catalyst as an anti-plating agent, said catalyst comprising an alkali metal or ammonium salt of a copolymer of maleic acid anhydride and an unsaturated branched chain aliphatic olefinic hydrocarbon containing 4 to 10 carbon atoms.

15 Claims, No Drawings

CATALYTIC HYDROGEN REDUCTION OF METALS FROM SOLUTIONS

This invention relates to the hydrogen reduction of metals from aqueous solutions and, in particular, to a method for utilizing a catalyst together with hydrogen to inhibit the formation of metal agglomerates and the plating out of reduced metal on the surfaces of reaction vessels, such as autoclaves and the like.

STATE OF THE ART

It is known to recover such metals as nickel, cobalt and copper by the hydrometallurgical treatment of ores or concentrates wherein ultimately a purified solution is obtained containing the metal of interest as a dissolved salt. A method which has been successfully employed for recovering the metal value in the form of metal powder is to subject the solution to hydrogen reduction at elevated temperature and pressure while the solution is under agitation. Such a method is disclosed in U.S. Pat. No. 2,734,821. Intensive work in this field has led to the development of catalysts and nucleation agents to assure optimum results. A serious problem in the hydrogen reduction of such solutions is the tendency for the reduced precipitated metal to form agglomerates and to plate out on the surfaces of the reaction vessel in which the reaction is carried, such as in autoclaves. The plating out of the metal on parts of autoclaves is referred to as "plastering."

A method for minimizing the foregoing problem is disclosed in U.S. Pat. No. 2,853,380. The method comprises adding a finite amount of an addition agent which functions to lessen the surface activity of the reduced metal particles and inhibit the metal particles from bonding together in the form of agglomerates and from plating out on or plastering the walls of the autoclave with which the aqueous solution is in contact during the reaction. The addition agents proposed include acrylic and polyacrylic acids, and polymers, copolymers, derivatives and salts of acrylic and polyacrylic acids, among others.

While addition agents of the foregoing types have been helpful in further improving the kinetics of the reaction, a problem in commercial production is in obtaining as large a percentage reduction as possible, for example, over 95% reduction and more combined with minimum plating out of the reduced metal on autoclave parts, that is substantially below 3% of the total metal precipitated, such as below 2%, preferably below 1%.

In U.S. Pat. No. 3,694,185, a dispersing agent consisting of ethylene maleic anhydride is disclosed for controlling the physical characteristics of the powder product as evidenced by a decrease in the apparent density thereof.

There are several aspects to the hydrogen reduction process that must be carefully considered. For example, there are certain stages in reduction at which different results are obtained, depending upon the controls instituted in obtaining the desired results.

The formation of nuclei is important during the initiation of reduction and such formation can be rate-controlling of the overall reaction. Thus, nucleating agents may be added to insure rapid nucleation during the early stages of reduction.

The presence of seeding particles can be important. For example, fine metal particles of the product metal including those formed nucleation, present as a suspension in the agitated aqueous solution, provide surfaces on which precipitated metal may deposit and build up the particle size. The latter is used as a means of densifying the product, this step being referred to as densification. Thus, densification is defined as reduction in the presence of seed powder under conditions in which additional metal is deposited to produce metal powder having a relatively high apparent density not obtainable under straight nucleation conditions.

Thus, the powder initially produced by reduction may be used as seeding material in subsequent reductions, that is to say, may be subjected to several or more densification stages, for example, from three to ten densifications or more depending on the powder characteristics desired. As regards reduction, nucleation and densification reactions, reference is made to U.S. Pat. Nos. 2,796,343 and 2,853,374.

OBJECTS OF THE INVENTION

It is thus the object of the invention to provide a method for the efficient hydrogen reduction of metals from aqueous solutions.

Another object is to provide a catalytic process for the hydrogen reduction of metals selected from the group consisting of nickel, cobalt and copper from aqueous solutions in which the formation of agglomerates of reduced metal is substantially inhibited and in which substantially all of the metal in solution is recovered as a powder while avoiding plating out of metal on autoclave surfaces.

A further object is to provide a catalytic process for the hydrogen reduction of metals from solution, said catalytic process also including the addition of nucleating agents together with the catalytic agent.

These and other objects will more clearly appear when taken in conjunction with the following disclosure and the appended claims.

STATEMENT OF THE INVENTION

In its broad aspects, the invention provides a method for improving the precipitation efficiency of non-ferrous metal powder selected from the group consisting of nickel, cobalt and copper by the hydrogen reduction from an aqueous solution of at least one of said metals. The method comprises providing said solution with a small but effective amount of a catalytic agent in an autoclave sufficient to produce reduced powder in the non-agglomerated form while substantially preventing the plating out or plastering of said reduced metal on parts of said autoclave in contact with said solution.

Broadly stated, the catalytic agent is an alkali metal or ammonium organic salt of a copolymer of maleic acid anhydride and a branch chained unsaturated aliphatic olefinic hydrocarbon of 4 to 10 carbon atoms, such as diisobutylene. The salt of the maleic acid anhydride-diisobutylene copolymer is particularly preferred as the catalyst. Preferably, the mole ratio of the maleic acid anhydride to the unsaturated aliphatic olefinic hydrocarbon (4 to 10 carbon atoms) is 1:1.

The aqueous solution with the catalyst is then subjected to reduction with sulfur-free hydrogen under elevated temperature and pressure while continuously agitating the solution to thereby produce a substantially sulfur-free metal product at an overall reduction efficiency of over 96% and generally at least about 98%, while substantially inhibiting agglomeration of the powder and plating out of said powder on parts of the autoclave. Particularly good results were obtained where the catalyst was used in combination with nucleation agents, such as ferrous ions or NaCN+Na$_2$S.

Tests conducted with the sodium salt of maleic acid anhydride-diisobutylene copolymer in comparison with certain dispersants, surfactants, flocculants, flotation collectors and the like showed this salt to be the best anti-plating agent.

Hydrogen reduction batch tests were carried out in a two-liter stainless autoclave with a glass liner. The conditions under which the tests were conducted except for the particular catalyst used were as follows:

| | |
|---|---|
| Temperature | 190° C (375° F) |
| Hydrogen Partial Pressure | 450 psig |
| Agitation (2 impellers) | 1200 rpm |
| Time | Nucleation 30 min. |
| Volume of Solution | 600 ml |
| Nickel Ammonium Sulfate | Ni - 41 gpl |
| Feed Solution | (NH$_4$)$_2$SO$_4$ 125 gpl |
| | NH$_3$/Ni Mole Ratio 2:1 |

After sealing, the autoclave is purged with nitrogen first and then with hydrogen. The nucleating catalyst (for seeding tests only) and anti-plating agents are introduced into the autoclave with required hydrogen pressure when the temperature reaches 150° C (302° F). The temperature then reaches 190° C (375° F) during the hydrogen injection and the temperature maintained during the test.

As soon as the nucleation is finished, the hydrogen supply, agitators and temperature are shut off. The autoclave is cooled, disassembled, emptied and cleaned with mild nitric acid between runs to insure that no nickel is left to catalyze the subsequent reduction runs. The so-called anti-plating agents which showed considerable plating (at least 3% or higher) or poor reduction efficiency, were eliminated. The agents which appeared to show promise were again used through three densifications using the nickel powder as nuclei for the seed run.

The nickel powders were evaluated by using a micromesh screen (5 to 53 microns), the size distribution being determined by wet screening, drying and weighing. Apparent density was determined by weighing one cubic centimeter of the metal powder.

Tests conducted using 0.3 gpl of the sodium salt of maleic acid anhydride - diisobutylene copolymer alone resulted in a percent reduction of 98% and percent plating loss of only 0.3%.

However, in running seeding tests ferrous ions were employed as a nucleating catalyst in an amount corresponding to 0.3 gpl.

Using the conditions stated hereinabove, except for the inclusion of ferrous ions as a nucleation catalyst (0.3 gpl), tests were conducted comparing materials known by certain trade names with the catalyst of the invention. The materials tests are given as follows:

Table 1

| | |
|---|---|
| Dispersants | |
| Acrysol A-3 | Polyacrylic acid (CH$_2$CHCOOH)n |
| Tamol 850 | Polyacrylic acid (CH$_2$CHCOOH)n |
| Tamol N | sodium salt of sulfonated formaldehyde and naphthalene |
| Flotation Promoters | |
| Aeroflot 242 | Aryl dithiophosphoric acid |
| Sodium Aeroflot | Sodium diethyl-dithiophosphate |
| Aero Promoter 845 | Anionic sulphonate promoter |
| Surfactant | |

Table 1-continued

| | |
|---|---|
| Aerosol OT | anionic (2-ethyl sodium sulfosuccinate) |
| Flocculants | |
| Aerofloc 550 | Anionic flocculant |
| Primafloc C-3 | Cationic polyelectrolyte |
| Flotation Reagents | |
| Aero 301 Zanthate | Sodium secondary butyl Xanthate |
| Mineric B | Copper floater |
| Catalyst used in the invention | sodium salt of maleic acid anhydride - diisobutylene copolymer |

Each of the foregoing was employed in an amount of 0.3 gpl together with 0.3 gpl ferrous ions in the form of ferrous sulfate. The percent reduction was determined for the nickel solution stated hereinbefore together with the amount of plating on autoclave parts. A percent plating of at least about 3% is deemed to be undesirable based on the total nickel reduced. The following results were obtained under the conditions given hereinbefore:

Table 2

| Additives | Percent Plating | Percent Reduction |
|---|---|---|
| Acrysol A-3 | 3 | 95 |
| Tamol 850 | 0.5 | 84 |
| Tamol N | 5 | 97 |
| Aeroflot 242 | 3 | 25 |
| Sodium Aeroflot | 10 | 25 |
| Aero Promoter 845 | 25 | 99 |
| Aerosol OT | 50 | 25 |
| Aerofloc 550 | 50 | 25 |
| Primafloc C-3 | 5 | 98 |
| Aero 301 Xanthate | 5 | 90 |
| Minerec B | Severe Plastering | 75 |
| Catalyst used in the invention (sodium salt of maleic acid anhydride - diisobutylene copolymer) | 0.3 | 99 |

As will be clearly apparent, the catalyst employed in carrying out the invention provides markedly improved combination of results, that is, high reduction efficiency (99%) coupled with low plating losses (0.3% plating).

On the other hand, the remaining additives tested either have too high a plating loss and/or too low a reduction efficiency. For example, Acrysol A-3 and Tamol 850 (polyacrylic acids) do not provide the desirable combination of results, the former exhibiting a relatively high plating loss of 3% coupled with an overall reduction efficiency of 95%, while the latter provides a low plating loss coupled with a relatively low overall reduction efficiency.

Tests were also conducted comparing the additive Tamol 850 (polyacrylic acid) with the catalyst of the invention (sodium salt of maleic acid anhydride-diisobutylene copolymer) in which an average of three densification runs was employed, each of the foregoing additives being used in an amount of about 0.3 gpl in the initial nucleation run and about 0.2 gpl in the densification run. The results obtained are given as follows:

Table 3

Comparative Analysis of Reduced Nickel Metal Using Tamol 850 and Catalyst of Invention

| Conditions: | |
|---|---|
| Temperature | 190° C (375° F) |
| Hydrogen Partial Pressure | 450 psig |
| Agitation (2 impellers) | 1200 rpm |
| Nucleation Time | 30 minutes, |

Table 3-continued

Comparative Analysis of Reduced Nickel Metal Using Tamol 850 and Catalyst of Invention

| | |
|---|---|
| Nucleating Catalyst | Densification time: 20 min. 0.3 gpl Fe$^{++}$ |
| Volume/Test | 600 ml |
| Nickel Ammonium Sulfate Feed Solution | Ni - 41,gpl (NH$_4$)$_2$SO$_4$- 125 gpl, NH$_3$/Ni Mole Ratio: 2:1 |

| | Tamol 850 | Catalyst of Invention |
|---|---|---|
| Percent Reduction | | |
| Nucleation | 85 | 98 |
| Densification (Av. of 3) | 91 | 99 |
| Apparent Density, g/cc | | |
| Nucleation | 2.07 | 0.62 |
| Third Densification | 2.26 | 3.00 |
| screen Analysis - Microns | Distribution, % | Distribution, % |
| Nucleation | | |
| +53μ | 0.14 | 34.32 |
| +38–53μ | 0.60 | 19.66 |
| +20–38μ | 10.14 | 32.36 |
| +15–20μ | 9.20 | 5.12 |
| +10–15μ | 44.12 | 4.87 |
| +5–10μ | 30.88 | 2.64 |
| −5 | 4.92 | 1.02 |
| Third Densification | | |
| +53μ | 28.36 | 25.29 |
| +38–53μ | 43.68 | 18.51 |
| +20–38μ | 23.46 | 36.12 |
| +15–20μ | 0.84 | 11.09 |
| +10–15μ | 1.54 | 7.53 |
| +5–10μ | 0.70 | 0.59 |
| −5μ | 1.24 | 0.14 |
| Nickel Powder - Assay After 3 Densifications (%) | | |
| Ni | 99.0 | 99.0 |
| Fe | 0.0025 | 0.0025 |
| s | 0.002 | 0.002 |

The nucleation runs, that is, the runs before densification, showed the catalyst employed in the invention to be superior to Tamol 850, in addition to bein superior following the densification runs. Following the third densification run, the apparent density of the nickel powder produced in accordance with the invention was higher, this being attributed to the fact that a better size distribution is obtained with the invention. It will be noted that, with either additive, a high purity nickel product is obtained, the method of the invention being more efficient, however.

Some tests were conducted in which no additives were employed and in which Tamol 850 (polyacrylic acid) was compared to the catalyst of the invention with and without nucleating agents. Where the nucleation agent employed was ferrous ions, the amount was 0.3 gpl, and where the nucleation agent was NaCN plus Na$_2$S, the amount was 1.5 gpl NaCN combined with 0.08 gpl Na$_2$S.

The following autoclave conditions were employed:

| | |
|---|---|
| Temperature | 190° C (375° F) |
| Hydrogen partial pressure | 450 psig |
| Agitation (2 impellers) | 1200 rpm |
| Nucleation time | 30 minutes |
| Volume of test | 600 ml |
| Nickel ammonium sulfate solution | 41 gpl Ni 125 gpl (NH$_4$)$_2$SO$_4$ 2:1 NH$_3$/Ni ratio |

The results are given in Table 4 as follows:

Table 4

| Additives | % Reduction | % Plating* |
|---|---|---|
| None | 5 | 75** |
| Tamol 850 | 44 | 45 |
| Tamol 850 plus Fe$^{++}$ | 84 | 0.5 |
| (A) Sodium salt of Maleic Acid Anhydride - Diisobutylene Copolymer | 98 | 0.3 |
| (A) plus Fe$^{++}$ | 99 | 0.3 |
| (A) plus NaCN + Na$_2$S | 99 | 0.2 |

*% nickel plated to total nickel reduced.
**Includes a precipitate that was sticky.

As will be noted, Tamol 850 used alone does not provide the results of catalyst (A) used alone. Even when Tamol 850 is used with ferrous ions as a nucleating agent, only 84% of the nickel in solution is reduced, while, by contrast, catalyst (A) employed in the invention provides markedly improved results.

A prerequisite in nickel powder product is initially to form fine particles of low apparent density in the nucleation run. The finer the particles, the more numerous the particles, and hence the greater the area for nucleating. Referring to Table 3, it will be noted that the run using the invention provided a very low apparent density of 0.62 during the nucleation run.

Salts of maleic acid anhydride - diisobutylene copolymer are disclosed in U.S. Pat. Nos. 2,840,491, 2,865,877, 2,930,775, 2,971,934, 3,236,797 and 3,436,233 for various uses, such as a surface active agent for use in coating polyethylene films, as a dispersing agent for dispersing finely divided polymers, such as acrylics, and in paints, and as a wetting agent in the electroless plating of copper. However, none of these patents suggests the use of the aforementioned copolymer salt for improving the reduction efficiency of such metals as nickel, cobalt and copper from aqueous solutions.

As stated herein, only a small but effective amount of the catalyst need be employed in carrying out the invention. Such small but effective amounts may range from about 0.005 to 0.5 gram per liter (gpl) in the initial nucleation run and about 0.005 to 0.1 gram per liter in each of the densification runs.

It is preferred that the catalyst be employed with nucleating agents, such as those selected from the group consisting of ferrous ions in an amount ranging from 0.05 to 0.5 gpl and the combined nucleating agents NaCN plus Na$_2$S in a total amount ranging from about 0.1 to 2 gpl, each being present in an amount of at least 0.05 gpl.

The catalyst may broadly comprise an alkali metal and ammonium salts of maleic acid anhydride and a branch chained unsaturated aliphatic olefinic hydrocarbon copolymer, the hydrocarbon containing 4 to 10 carbon atoms. It is preferred to use the alkali metal or ammonium salt of maleic acid anhydride - diisobutylene copolymer, such as the sodium salt thereof.

In carrying out the precipitation in an aqueous solution using hydrogen as the reductant, the temperatures employed may range from about 50° C to 220° C at a hydrogen partial pressure of over 50 psig and ranging up to about 500 psig.

In the case of an aqueous solution of a nickel ammonium sulfate, the nickel composition of the solution may range from about 10 to 100 gpl of nickel, from about 10 to 350 gpl of (NH$_4$)$_2$SO$_4$, the NH$_3$:Ni molar ratio ranging from about 2:1 to 4:1.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of improving the precipitation efficiency of non-ferrous metal powder selected from the group consisting of nickel, cobalt and copper by hydrogen reduction from an aqueous solution of at least one of said metals which comprises, providing said aqueous solution with a small but effective amount of a catalytic agent in an autoclave sufficient to avoid agglomeration of precipitated metal powder while substantially preventing the plating out of said metal on parts of said autoclave in contact with said solution, said catalytic agent comprising an organic salt selected from the group consisting of alkali metal and ammonium salts of a copolymer of maleic acid anhydride and a branched chain aliphatic olefinic hydrocarbon of 4 to 10 carbon atoms, and then subjecting said solution to reduction with sulfur-free hydrogen under elevated temperature and pressure while continuously agitating said solution and thereby produce a sulfur-free metal powder at an overall reduction efficiency of over 96% while substantially avoiding agglomeration of said metal powder and plating out of said reduced metal on autoclave parts in contact with said solution.

2. The method of claim 1, wherein said catalytic agent is selected from the group consisting of alkali metal and ammonium salts of the maleic acid anhydride and diisobutylene copolymer.

3. The method of claim 2, wherein said solution also includes a small but effective amount of a nucleating agent selected from the group consisting of ferrous ions and NaCN plus $Na_2S$.

4. The method of claim 2, wherein the amount of said catalytic agent ranges from about 0.005 to 0.5 grams per liter.

5. The method of claimm 3, wherein said amount of nucleating agent selected from said group ranges from about 0.05 to 0.5 grams per liter ferrous ions and 0.1 to 2 grams per liter total of NaCN plus $Na_2S$, said each of NaCN and $Na_2S$ being at least about 0.05 grams per liter.

6. The method of claim 2, wherein said hydrogen reduction is carried out at a temperature of about 50° C to 220° C and a hydrogen partial pressure of over 50 psi and ranging up to about 500 psi.

7. The method of claim 2, wherein said aqueous solution is a nickel solution.

8. The method of claim 7, wherein said nickel solution contains about 10 to 100 grams per liter of nickel, about 10 to 350 grams per liter of $(NH_4)_2SO_4$ and wherein the $NH_3$:Ni molar ratio ranges from about 2:1 to 4:1.

9. A method of improving the precipitation efficiency of non-ferrous metal powder selected from the group consisting of nickel, cobalt and copper by hydrogen reduction from an aqueous solution of at least one of said metals which comprises, providing said aqueous solution with a small but effective amount of a catalytic agent in an autoclave sufficient to avoid agglomeration of precipitated metal powder while substantially preventing the plating out of said metal on parts of said autoclave in contact with said solution, said catalytic agent comprising an organic salt selected from the group consisting of alkali metal and ammonium salts of maleic anhydride-diisobutylene copolymer, and then subjecting said solution to reduction with sulfur-free hydrogen under elevated temperature and pressure while continuously agitating said solution and thereby produce a sulfur-free metal powder at an overall reduction efficiency of over 96% while substantially avoiding agglomeration of said metal powder and plating out of said reduced metal on autoclave parts in contact with said solution.

10. The method of claim 9, wherein said solution also includes a small but effective amount of a nucleating agent selected from the group consisting of ferrous ions and NaCN plus $Na_2S$.

11. The method of claim 9, wherein the amount of said catalytic agent ranges from about 0.005 to 0.5 grams per liter.

12. The method of claim 10, wherein said amount of nucleating agent selected from said group ranges from about 0.05 to 0.5 grams per liter ferrous ions and 0.1 to 2 grams per liter total of NaCN plus $Na_2S$, said each of NaCN and $Na_2S$ begin at least about 0.05 grams per liter.

13. The method of claim 9, wherein said hydrogen reduction is carried out at a temperature of about 50° C to 220° C and a hydrogen partial pressure of over 50 psi and ranging up to about 500 psi.

14. The method of claim 9, wherein said aqueous solution is a nickel solution.

15. The method of claim 14, wherein said nickel solution contains about 10 to 100 grams per liter of nickel, about 10 to 350 grams per liter of $(NH_4)_2SO_4$ and wherein the $NH_3$:NI molar ratio ranges from about 2:1 to 4:1.

* * * * *